Dec. 2, 1947.     J. W. DIBRELL ET AL     2,431,994

SYSTEM FOR TRANSFORMING AND CONVERTING ELECTRIC POWER

Filed Jan. 21, 1943     2 Sheets-Sheet 1

Inventors
James W. Dibrell,
Fennell Dibrell, Jr.,
By Frank S. Appleman,
Attorney.

Dec. 2, 1947.    J. W. DIBRELL ET AL    2,431,994
SYSTEM FOR TRANSFORMING AND CONVERTING ELECTRIC POWER
Filed Jan. 21, 1943    2 Sheets-Sheet 2

Inventors
James W. Dibrell,
Fennell Dibrell, Jr.,
BY Frank S. Appleman,
Attorney.

Patented Dec. 2, 1947

2,431,994

UNITED STATES PATENT OFFICE 2,431,994

SYSTEM FOR TRANSFORMING AND CONVERTING ELECTRIC POWER

James Wendell Dibrell, Coleman, and Fennell Dibrell, Jr., Arlington, Tex.

Application January 21, 1943, Serial No. 473,132

3 Claims. (Cl. 175—363)

This invention relates to systems for transforming and converting electric power, and in particular to systems for producing a direct current voltage whose mean effective value maintains accurately a desired quantitative relation with an alternating current voltage from which it is derived.

More especially, this invention relates to constant potential systems for the production of a direct current voltage whose mean effective value is constant over extended intervals, notwithstanding relatively large variations in the alternating current voltage from which it is derived.

An object of this invention is to provide an electronic rectifier system for converting alternating current energy into direct current energy, while maintaining a desired relation between the magnitude of the output voltage and the input voltage.

Another object of this invention is to regulate the direct current voltage produced by electronically rectifying an alternating current voltage.

A further object of the invention is to interpose in the electronic path wherein an alternating current voltage is being rectified, a mirror image of the rectified alternating current voltage, of proper phase and magnitude, in such manner as to produce an output direct current voltage of desired characteristics over a period of time.

A still further object of the invention is to provide an auxiliary full floating rectifier unit connected to a source and comprising means for adjusting the magnitude and phase of its output, and to apply its adjusted output in the main rectification path wherein energy from the same source is being rectified.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 1:
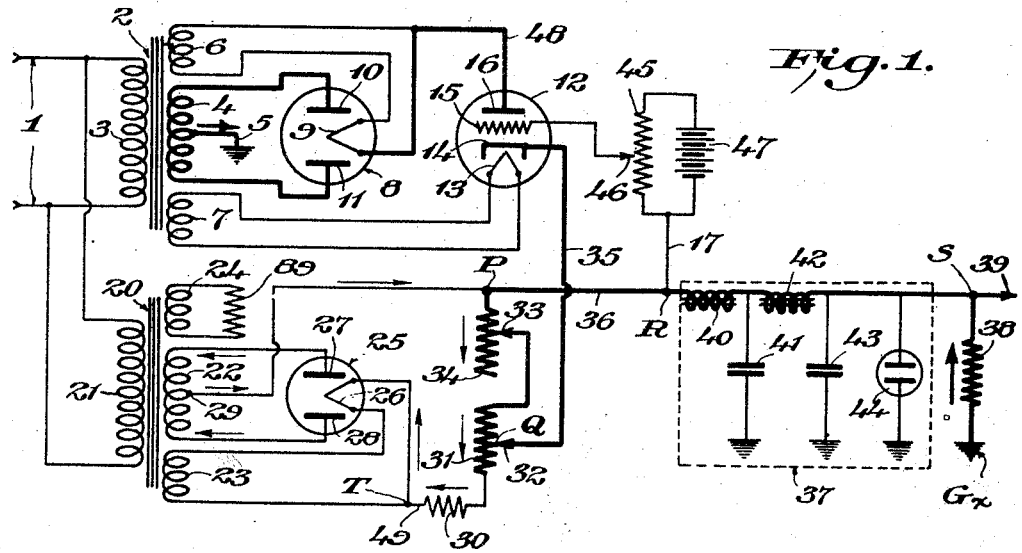
Figure 1 is a circuit diagram showing a full-wave rectifier system embodying the voltage control system.

Systems heretofore employed for the voltage control of rectifiers have usually fed back part of the main rectifier output to the input of the main rectifier, and have not employed a separate rectifier for control purposes. These systems have not produced satisfactory results, and they introduce many complications in design and phase shift problems, which we entirely avoid.

We provide an auxiliary rectifier unit whose circuit elements including transformer windings are matched in electrical characteristics with the main rectifier unit, so that the output of the auxiliary rectifier unit has the same wave form as the output of the main rectifier unit has when no correction is applied from the auxiliary rectifier unit.

In one application, we apply rectified but unfiltered voltage to the plate of an output control tube, and rectified but unfiltered voltage of identical wave form and frequency, but of smaller amplitude and of opposite phase, to the grid of the output control tube, with the result that the voltage wave output from the output tube is a rectified but unfiltered unidirectional voltage whose alternating current component is of the same frequency as the input line voltage, but has the same uniform peak amplitude values over a period of time, and hence unvarying value of effective voltage. By avoiding the interposition of filters in the control circuit, as used in prior devices, we avoid introducing a time delay factor into the regulating action. We therefore regulate before filtering the output of the power rectifier tube. This manner of controlling the plate current of our output control tube is an outstanding feature of our invention.

Referring to the drawings in detail, a source 1 of alternating current, which may be of usual commercial frequency and voltage, is applied to the primary winding 3 of a transformer 2 having a principal power secondary winding 4 and other secondary windings 6 and 7 for supply filament current. A double diode 8 of usual type has cathode 9 and anodes 10 and 11. The mid-point of secondary 4 is grounded at 5, and its ends are respectively connected to anodes 10 and 11, constituting a full wave rectifier.

An output control tube 12 is interposed in the output circuit of the main power rectifier tube 8 for the purpose of varying and controlling the magnitude of the output of rectifier 8. Control tube 12 is advantageously an amplifier heater triode, but other type of electron tube may be used. Control tube 12 has cathode 14 and heater 13, control grid 15, and anode 16. The anode 16 is directly connected to the cathode 9 of rectifier 8 by a connection of uniform frequency characteristic.

An auxiliary transformer 20 has its primary winding 21 connected to source 1, in parallel with primary 3 of transformer 2. Auxiliary transformer 20 has a principal secondary winding 22 which supplies the principal secondary output, and also has other secondary windings 23 and 24, the former of which supplies filament current for auxiliary double diode 25 which performs a control function. The midpoint of secondary winding 22 has an ungrounded output connection 29. The double diode 25 with its connections constitutes an auxiliary full wave rectifier.

A regulating unit is interposed in the output circuit of this auxiliary rectifier, and includes, connected in series, a potentiometer 31 and a variable resistor 34, having slider contact 33. One terminal of potentiometer 31 is connected to cathode 26 of diode 25 through a resistor 30 at point T. The variable tap of potentiometer 31 at point Q is connected to the cathode of control tube 12 by the connection 35. One terminal of variable resistor 34 is connected at point P to the midpoint connection 29 of secondary 22.

The point P is connected through wires 36 and 17 and a bias adjuster 45, to control grid 15 of control tube 12. The connections 17 and 36 to the bias adjuster are pure resistance and do not comprise filter elements, and hence have a uniform frequency characteristic.

Auxiliary transformer 20 has another secondary winding 24 which is usually connected to a dummy resistance load 89 and is ordinarily used for preserving symmetry.

Auxiliary transformer 20 and its windings and auxiliary double diode 25 and the associated circuit elements are of the same type and are carefully matched and correspond respectively throughout with transformer 2 and its windings and double diode 8 and the associated circuit elements, so that the impressed voltage is subjected to the same influences in the auxiliary rectifier unit as in the main power rectifier unit, and the voltage wave output of the auxiliary rectifier unit of tube 25 is identical in shape and frequency with the voltage wave output of the main power rectifier unit of tube 12. That is, transformers 2 and 20, rectifier tubes 8 and 25, should be as nearly equivalent as possible, as should also the resistance of resistors 30, 31, and 34 be as nearly equal as possible to the internal resistance of tube 12 between cathode and anode. Such equivalent relation avoids any phase shift between the main power rectifier circuit and the auxiliary rectifier circuit, so that in control amplifier tube 12 the voltage wave impressed on grid 15 is exactly 180 degrees out of phase with the voltage impressed on plate 16.

Grid 15 of control tube 12 is connected to the midpoint 29 of winding 22, while anode 16 of control tube 12 is connected to cathode 9 of diode 8 which is electronically connected to and in phase with the positive voltage at the respective ends of winding 4. Hence, at a given instant, the A. C. potential component on grid 15 of the control tube is 180 degrees out of phase with the A. C. potential component on anode 16. The magnitude of the potential thus applied between cathode 14 and grid 15 of control tube 12, from the auxiliary rectifier 25, may be adjusted in desired manner by adjusting the variable tap 32 on potentiometer 31. By making suitable adjustment of this potentiometer 31 to conform to the amplification factor of control tube 12, and by adjusting variable resistor 34, and bias adjuster 45, and since the wave forms are identical, the voltage applied between grid 15 and cathode 14 could, if desired, be made to exactly erase the voltage applied between anode 16 and cathode 14, in which case the system would deliver no output at point R.

However, potentiometer 31—32 and resistor 33—34 and bias adjuster 45 are usually so set as to apply a negative grid bias of such value that the output voltage of tube 12 is maintained at a constant desired value, regardless of variations in the voltage of source 1. Our arrangement accomplishes this with a fluctuation of less than 0.001% of the line voltage fluctuation of source 1, if the circuit elements are properly chosen and adjusted. No device has been heretofore available to attain this result.

It is also possible, by suitable setting of potentiometer 31—32 and resistor 33—34, to obtain an output voltage at point R which varies inversely in desired ratio with the line voltage of source 1, or to obtain an output voltage at point R which varies directly in any desired ratio less than 1:1 with the line voltage.

The potentiometer 45 having variable tap 46 and connected across battery 47, and interposed in connection 17 from the auxiliary control unit to grid 15 of tube 12, provides for adjustment of the constant voltage applied as bias to grid 15 of tube 12 and the mean effective grid bias, so that the negative control voltage appearing across points PQ will not reduce the constant plate current of tube 12 below the desired level. This potentiometer 45 should be properly adjusted to get best results.

A main power output load resistor 38 is connected by wire 36 between the point P terminal of resistor 34, and ground. Interposed in this connection, between point R where wire 17 leads to the grid 15 of tube 12, and ground, may be a filter unit 37 comprising suitable filter elements 40, 41, 42, 43, and may also comprise a gas tube 44. The gas tube compensates for variable loads. This filter unit performs its usual function of smoothing out the output wave so that a substantially smooth output wave without ripples is produced. The rectified output power of constant or other desired voltage characteristic is delivered by connection 39 from the upper terminal S of load resistor 38. Our invention may be employed, however, without any filter unit such as 37, without departing in any respect from the spirit of our invention, since the value of mean effective voltage is constant in either case.

Our control circuit, for supplying grid control voltage to grid 15 of control tube 12, by using the separate rectifier 25 and separate transformer winding 22, is full floating, that is the control circuit is not grounded at any point through a simple resistance, which constitutes a path for the control current, but only through a space path. Hence, the potential of the control circuit path with respect to ground is affected only by the output current of control tube 12. If a ground connection is applied to the control current path at some other point or in more direct manner, the system will not function in the desired manner.

This full floating condition is an important feature of our invention and has not been provided in any arrangements heretofore described.

The voltage between output point R and ground depends on the plate current of control tube 12, and the problem of obtaining delivery of a constant value of mean effective voltage from our circuit is to prevent any variation in the plate current of tube 12, regardless of variation in the voltage impressed on the plate of tube 12. This is accomplished by applying to the grid of tube 12, the out-of-phase wave whose amplitude is adjusted by potentiometer 31 and resistor 34.

Figure 2:
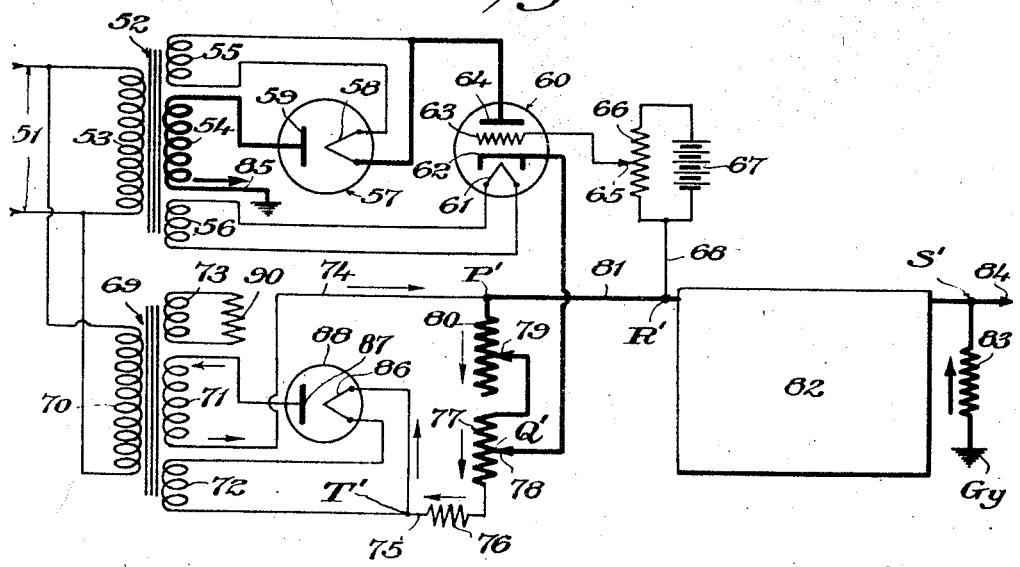
Figure 2 is a circuit diagram showing a half-wave rectifier system embodying the voltage control system.

The path of the rectified main power output current constituting the main power output circuit is shown in heavy lines in Figs. 1 and 2, and passes from the anodes of main power rectifier tube 8 to secondary winding 4 and thence to ground through the mid-tap 5, thence through return ground connection Gx and output load resistor 38, point S, filter unit 37, point R, wire 36, point P, resistor 34 and its slider 33, the upper part of potentiometer element 31, point Q, wire 35, to cathode 14 of output control tube 12, anode 16 of tube 12, lead 48, to cathode 9 of rectifier tube 8. In passing through resistor 34 and potentiometer 31, this main output current affects the potential between points P and Q, which is the potential difference between the grid and cathode of control tube 12.

The path of the rectified auxiliary control current constituting the control circuit is indicated in Figs. 1 and 2 by light arrows, and passes from the anodes of auxiliary rectifier tube 25 through secondary winding 22 and its mid-point tap 29 to the point P, thence through variable resistor 34 and its slider 33, the full length of the potentiometer element 31, resistor 30, and wire 49, to point T, thence to cathode 26 of rectifier tube 25. In passing through resistor 34 and potentiometer 31, this control current varies the potential difference between points P and Q, and the magnitude of this potential difference can be adjusted by adjusting the slider 33 on resistor 34, and adjusting the setting of adjustable contact tap 32 on potentiometer 31.

The potential difference between points P and Q less the potential drop across the lower part of potentiometer winding 45, is the potential difference between the grid and cathode of control tube 12, whereby the output from anode 16 of control tube 12 is adjusted. It will be noted that it is the ends of secondary winding 4 from which a path without other source of signal energy is provided to the anode 16 of control tube 12, while it is the mid-tap 29 of secondary winding 22 from which a path without other source of signal energy is provided to the grid 15 of control tube 12. At a given instant, the mid-tap 29 is 180 degrees out of phase with the ends of winding 4, and hence, at a given instant the potential on grid 15 is 180 degrees out of phase with the potential on anode 16. It will also be noted that while the mid-point of winding 4 is grounded at 5, the mid-point of winding 22 is not grounded, but is connected by wire 29 to point P, and therefore the control circuit path does not pass through ground as does the main power output current path.

The potential of point P above ground, and hence the potential across output resistor 38, depends directly upon the plate current of output control tube 22. This plate current in turn depends on two factors, first the voltage applied to the anode 16 of output control tube 12 by rectifier unit 4—8, and second, the value of the negative bias on the control grid 15 of output control tube 12. This negative grid bias on grid 15 is furnished by the auxiliary control rectifier unit 22—25, and is the potential between points P and Q across variable resistor 34 and the upper part of potentiometer element 31.

The instantaneous potential difference between points P and Q in turn depends on the rectified control current delivered from the anodes of auxiliary rectifier tube 25 through auxiliary transformer winding 22 and its center tap 29 and passing through resistor 34 and potentiometer element 31. An increase in this control current will result if the supply voltage of source 1 increases, and will cause an increase of the potential difference between points P and Q, and hence will increase the negative bias applied to grid 15 of output control tube 12. If variable resistor 34 and potentiometer 31 have been properly adjusted, this increase in the negative bias applied to grid 15, will act to prevent an increase in the output plate current of output control tube 12, instead of such output plate current of tube 12 increasing as would otherwise occur when the voltage of source 1 increases. Correspondingly, if the voltage of source 1 decreases, there will be a decrease of the negative bias applied to grid 15.

The determination of which one of the three modes of operation above mentioned is attained depends on the adjustment of potentiometer 31 and variable resistor 34.

To obtain a constant voltage output notwithstanding variations in the voltage of the source 1, adjustments must be so made that the ratio of the amplitude $b$ of the negative half waves (Fig. 6) applied to grid 15, to the amplitude $a$ of the positive half waves (Fig. 5) applied to anode 16, will be the reciprocal of the amplification factor which control tube 12 has in the range in which it is operating, which range is set by the adjustment of potentiometer 45. The coarse adjustment is made by potentiometer 31 and the fine adjustment by variable resistor 34, so as to divide the voltage output of tube 25 between the points P and Q, and between points Q and T, in such manner that the ratio of potential PQ to potential QT is equal to the reciprocal of the amplification constant of tube 12. This adjustment can be calculated theoretically from the intended range of operations and the tube characteristics, which will suffice for most purposes. However, if close output voltage regulation is desired, as to 0.001%, the output of the system should be checked with a vacuum tube voltmeter and sensitive galvanometer while fine adjustment is made with variable resistor 34.

To obtain an output voltage which varies inversely in any desired ratio with the line voltage, the potentiometer 31 and resistor 34 should be so adjusted that the ratio of voltage QT to voltage QP is less than the amplification factor of tube 12, in whatever ratio is desired.

To obtain an output voltage which varies directly in any desired ratio less than 1:1 with the line voltage, the potentiometer 31 and variable resistor 34 should be so adjusted that the ratio of voltage QT to voltage QP is greater than the amplification factor of tube 12 in whatever ratio is desired.

The control tube 12 must be chosen to have such characteristics that its amplification constant will not vary over the range of voltages to be applied to its anode, when the potentiometer 45 is adjusted to give the desired current flow, when the output is to be held constant, in the first mode of operation above described. When potentiometer 31 and variable resistor 34 have been adjusted as above described, no further adjustments will be required because of any ordinary changes in the voltage of source 1, or unless there is some abnormal change in the source, as a change from 110 volt to 220 volt A. C. supply. If these adjustments have been properly made, a fluctuation of 40% to 50% in supply voltage will not affect the voltage output of the system.

The half-wave rectifier system shown in Fig. 2 applies the principle of our invention in substantially the same way as does the full-wave rectifier system of Fig. 1. Source 51 is applied to the primary winding 53 of main power transformer 52, and also to primary 73 of auxiliary transformer 69. The main power rectifier tube 57 is a single diode half-wave rectifier with a single anode 59 and a cathode 58. The secondary 54 of main transformer 52 is connected at one end to anode 59 of single diode tube 57 and at the other end is grounded at 85. Transformer 52 has other secondary windings 55 and 56 which respectively supply filament current for tubes 57 and 60. The anode 64 of output control tube 60 is connected to the cathode 58 of diode 57. The grid 63 of output control tube 60 is connected through potentiometer 65, 66, 67, and the points R' and P' to the control circuit path between points P' and Q' across resistor 80 and potentiometer 77, which are adjustable in manner similar to the corresponding arrangements in the circuit of Fig. 1. Auxiliary transformer 69 has principal secondary winding 71, one end of which is connected to the single anode 87 of auxiliary single diode 88, and the other end of which is connected by wire 74 to point P'. The filament 86 of auxiliary diode 88 is heated by another secondary winding 72 of auxiliary transformer 69, and at point T' is connected by wire 75 through resistor 76 to the remote end of potentiometer element 77. The adjustable tap 78 of potentiometer 77 is connected to cathode 62 of output control tube 60. The output point R' may be connected, if desired, through a filter unit 82 and the point S' to one terminal of the output load resistor 83 whose lower terminal is grounded at Gy, and the output lead 84 is connected to point S'. In the arrangement of Fig. 2, the paths of the main power rectified current and the control rectified current are respectively the same as have been described for the arrangement of Fig. 1.

Figure 3:
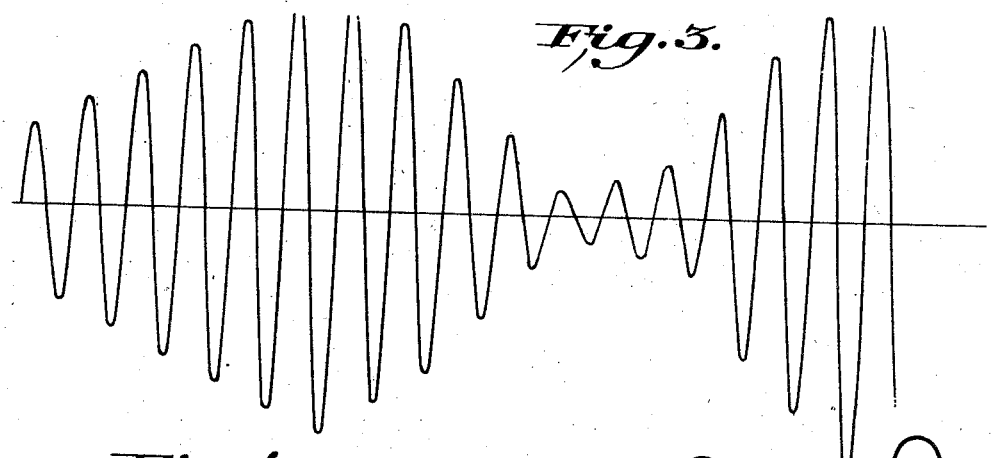
Figure 3 shows a poorly regulated alternating current input wave with varying amplitude.

Figure 3 shows an assumed alternating current wave form with varying amplitude from a source 1 having very poor regulation, which has been assumed for better illustrating the operation of our system.

Figure 4:
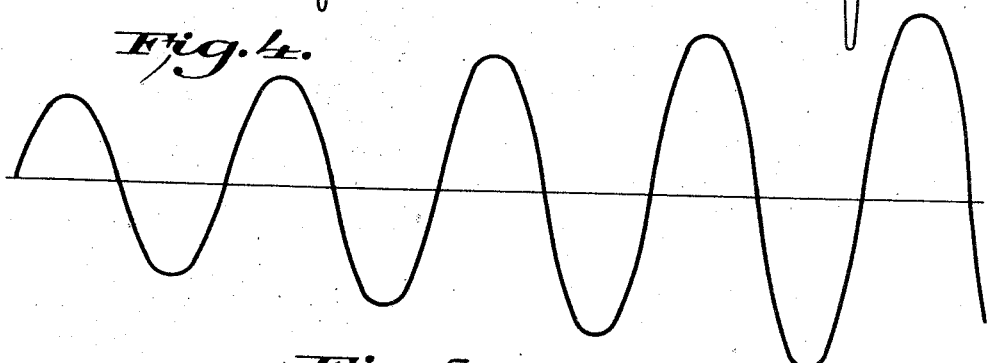
Figure 4 shows a portion of the alternating current wave of Figure 3 on a larger time scale.

Figure 4 shows on an enlarged time scale a portion of the wave of Fig. 3.

Figure 5:
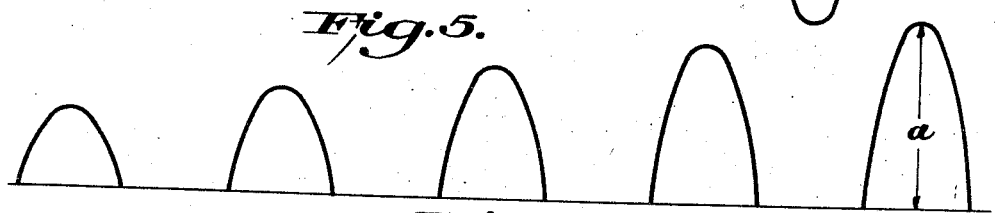
Figure 5 shows for a half-wave rectifier the positive halves of the wave of Fig. 4, after rectification.

Figure 5 shows the rectified resultant of the poorly regulated wave form of Fig. 4 as delivered from the output of a main power single diode half-wave rectifier 57 of Fig. 2, to the anode of the output control tube 60, if no correcting control potential is applied, and shows the varying amplitudes of the positive half-waves. The amplitude of one of the half-waves is shown as $a$.

Figure 6:
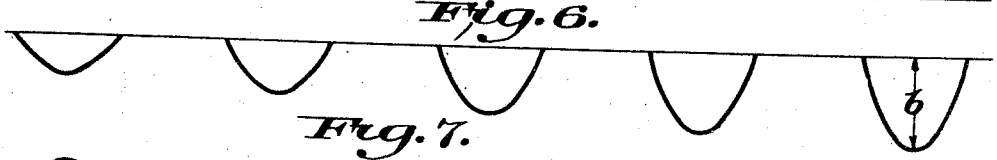
Figure 6 shows a control wave which is derived from the input wave through an auxiliary path, and is applied to the main rectification path in desired magnitude and phase, and is shown as 180 degrees out of phase with the wave of Fig. 5.

Figure 6 shows the rectified resultant derived from the source of the poorly regulated wave form of Fig. 4 as delivered from the output of an auxiliary rectifier single diode half-wave rectifier 88, and applied to the grid of the output control tube 60, showing the 180 degrees out-of-phase relation with the wave applied to the anode of the output control tube 60. The amplitude of the half-wave corresponding to the marked half-wave of Fig. 5 is shown as $b$.

Figure 7:
Figure 7 shows for half-wave rectification a resultant corrected unfiltered wave form, with constant value of amplitude and effective voltage.

Figure 7 shows for the half-wave rectifier system of Fig. 2, the half-waves as delivered in the output circuit of the output control tube 60 across the output load resistor 83 when proper correcting control potential has been applied to the grid of the output control tube 60 from control unit 88—77—80, and shows the constant amplitude of the resulting half-waves.

Figure 8:
Figure 8 shows for full-wave rectification a resultant corrected unfiltered wave form, with constant value of amplitude and effective voltage.

Figure 8 shows an output wave form of constant amplitude as produced by a full-wave rectifier system of Fig. 1 after proper correcting control has been applied to the grid of the output control tube 12, and corresponds to the corrected constant amplitude wave output of Fig. 7 for a half-wave rectifier system.

Figure 9:
Figure 9 shows for full-wave rectification the wave form of Fig. 8 after filtering.

Figure 9 shows the constant amplitude output wave of the full wave rectifier resultant of Fig. 8, after it has been filtered, and shows the residual ripple.

If a connection were made from point P directly to cathode 14, the system would not operate to provide a constant voltage output, but would operate to provide an output voltage which would vary directly with the anode voltage of tube 12, and there would be no attainment of any regulation whatever of the output voltage. As has been pointed out above, the potentiometer 31, resistor 30 and variable resistor 34 must be employed in order to adjust the amplitude $b$ of the negative half-waves of Fig. 6 applied to the grid of tube 12 in such manner that the ratio of anode voltage of tube 12 to grid voltage of tube 12 is equal to the amplification factor of tube 12, so that the current flowing through tube 12 will remain constant, thus producing a constant output voltage across output resistor 38. The adjustment of potentiometer 31 is the basic adjustment. Variable resistor 34 has a relatively low value of resistance in order to make possible a very fine adjustment of the division of the output voltage of rectifier tube 25 between points PQ and QT.

There are various uses of electrical power in which a source of very closely regulated direct current voltage is needed, particularly in research laboratories. Batteries do not give a close voltage regulation, unless the current drain is very small with reference to the capacity of the battery. Chemical, physical and biological research laboratories require an inexpensive source of closely regulated voltage in many kinds of experimental work, as in constant temperature units, and apparatus for measuring potential changes in tissue. Even at places where a source of direct current is available, it is seldom of such close regulation as to be useful for the mentioned uses in research laboratories and the like. Our system is intended to supply the need for a source of very closely regulated voltage of desired magnitude, for applications where the current drain is too great to permit the use of available battery units. Our voltage regulation system is much more simple than systems which have been heretofore described, which give regulation not as close as our system. Our system provides a very high degree of voltage regulation.

In the type of applications for which our system is primarily intended, the magnitude of the load does not fluctuate very much. A permanent change in the load will not affect the operation of our system, except perhaps to require a readjustment of potentiometer 45, or in cases of relatively large change in the load, it may be necessary to replace tube 12 by another tube of the same type but different characteristics. The gas tube 44 will assist in minimizing the effect of fluctuations in the load, if they occur.

It will be seen that the control voltage which we apply is adjustable, unfiltered, and ungrounded, and is applied to the main rectified current path, and that we employ separate matched rectifier units, which fact makes the control voltage of identical wave form with the main rectified voltage. Our system constitutes a substantial simplification over any precise voltage regulation rectifying system of the prior art.

The regulation of effective voltage which may be attained by our arrangement is much closer to absolute constancy than is attainable by means of batteries or by any type of rectifier system heretofore employed.

The system which we have described has been employed for the rectification of a line supply voltage which varied from 115 volts to 50 volts, without any variation whatever in the mean effective value of the rectified output voltage which could be detected with an instrument sensitive to 0.001 volt.

It will be obvious to those skilled in the art that the circuit arrangements which we have disclosed are susceptible of various modifications and rearrangements without any change in the principle of our invention, and all such modifications and rearrangements which are comprehended within the scope of the appended claims we consider to be a part of our invention.

We claim:

1. In a constant voltage rectifier system, a source of alternating current power, principal rectifying means, principal translating means arranged to transfer power from said source to said principal rectifying means, an output control tube having a cathode, an output electrode and a control electrode, a load output circuit, the output of said principal rectifying means being connected through the cathode and said output electrode of said control tube to said load output circuit, auxiliary rectifying means, auxiliary translating means arranged to translate power from said source to said auxiliary rectifying means, an auxiliary output circuit for said auxiliary rectifying means, said auxiliary output circuit comprising a resistor, and said load output circuit comprising said resistor, and a connection from a point in said auxiliary output circuit to said control electrode of said control tube, said point being so selected as to impress at a given instant on said control electrode an instantaneous potential which is of diametrically opposite phase to the instantaneous potential on said output electrode, said two translating means being mutually electrically similar and said two rectifying means being mutually electrically similar and being adapted to deliver output of identical wave form and frequency and extent in time.

2. In the rectification of supply alternating current into direct current employing an output control triode, and auxiliary rectifying means, the method of obtaining an output direct current voltage whose effective value is constant, which consists in rectifying a main portion of said supply alternating current, applying said so rectified main portion between the cathode and a second electrode of said triode, deriving a portion of said supply alternating current, rectifying in said auxiliary rectifying means said derived portion separately from the rectification of said main portion, applying with uniform frequency characteristic to the third electrode of said triode a voltage derived from said rectified derived portion and having an alternating current component which is of the same wave form and diametrically opposite in phase to the alternating current component of the voltage of the main rectified portion applied to said second electrode of said triode, adjusting the magnitude of the voltage so applied to said third electrode to deliver from said control triode an output voltage of desired magnitude, and deriving a supplemental voltage proportional to the rectified main portion, and applying to said third electrode of said triode the resultant of superposing said supplemental voltage on said voltage derived from said rectified derived portion.

3. In a constant voltage rectifier system, a source of alternating current power, principal rectifying means, principal translating means arranged to transfer power from said source to said principal rectifying means, an output control tube having a cathode, an output electrode and a control electrode, a load output circuit, the output of said principal rectifying means being connected through the cathode and said output electrode of said control tube to said load output circuit, auxiliary rectifying means, auxiliary translating means arranged to translate power from said source to said auxiliary rectifying means, an auxiliary output circuit for said auxiliary rectifying means, and a connection from a point in said auxiliary output circuit to said control electrode of said control tube, said point being so selected as to impress at a given instant on said control electrode an instantaneous potential which is of diametrically opposite phase to the instantaneous potential on said output electrode, said two translating means being mutually electrically similar and said two rectifying means being mutually electrically similar and being adapted to deliver output of identical wave form and frequency and extent in time, said auxiliary output circuit comprising an adjustably tapped variable resistor constituting a potentiometer, and said load output circuit comprising the portion of said resistor between its said tap and one of its terminals.

JAMES W. DIBRELL.
FENNELL DIBRELL, JR.

REFERENCES CITED

The following references are of record in the file of this patent:

UNITED STATES PATENTS

| Number | Name | Date |
|---|---|---|
| 1,364,129 | Meyer | Jan. 4, 1921 |
| 1,438,976 | Wold | Dec. 19, 1922 |
| 1,866,679 | Slepian | July 12, 1932 |
| 1,967,303 | Grant | July 24, 1934 |
| 2,035,125 | Grant | Mar. 24, 1936 |
| 2,315,445 | Milarta | Mar. 30, 1943 |